US005083143A

United States Patent [19]

Hoffman

[11] Patent Number: 5,083,143

[45] Date of Patent: Jan. 21, 1992

[54] ROTATIONAL ADJUSTMENT OF AN INK JET HEAD

[75] Inventor: Eldon P. Hoffman, West Linn, Oreg.

[73] Assignee: Tektronix, Inc., Beaverton, Oreg.

[21] Appl. No.: 633,840

[22] Filed: Dec. 26, 1990

[51] Int. Cl.[5] ........................ G01D 15/16; B41J 11/22

[52] U.S. Cl. ........................ 346/139 R; 346/140 R; 400/352

[58] Field of Search ........................ 346/39 R, 140 R; 400/352

[56] References Cited

U.S. PATENT DOCUMENTS

| | | | |
|---|---|---|---|
| 4,426,165 | 1/1984 | Irro | 400/352 X |
| 4,577,200 | 3/1986 | Rix et al. | 346/140 R |

*Primary Examiner*—Benjamin R. Fuller
*Assistant Examiner*—Gerald E. Preston
*Attorney, Agent, or Firm*—John D. Winkelman; Paul S. Angello

[57] ABSTRACT

The present invention entails an accurate, sensitive, and stable means of mounting a print head to a movable carriage assembly of the type used in computer output printers. The invention uses one pair of planar mounting surfaces and one pair of angled mounting surfaces between the print head and the carriage of a print head assembly. A pair of pivoting clamping plates apply a force that urges both pairs of mounting surfaces together while simultaneously providing adjustment of the translation of the print head relative to the carriage. The translation across the oppositely angled surfaces on two of the four mounting surfaces provides an accurate azimuthal angle adjustment for the print head. Because the other mounting surfaces are in the same plane, the translation affects only the azimuthal angle.

15 Claims, 5 Drawing Sheets

ROTATIONAL ADJUSTMENT OF AN INK JET HEAD

TECHNICAL FIELD

The present invention relates to print heads used in computer-driven graphics printers and, in particular, to the precision alignment of print heads having multiple closely spaced printing elements mounted on a movable carriage assembly.

BACKGROUND OF THE INVENTION

The proliferation of printed data has created a demand for data reduction technologies. Prime among such technologies has been computer graphics and its related field, computer graphics printing. Graphic printing techniques have evolved at a rapid pace and have included trends toward higher information density, full color printing, and higher printing speeds.

Those trends have driven printer technology in a number of areas. One such area is graphic print head technology. Print heads are electronically driven devices that form both characters and shapes as images on a print medium. Print heads form printed shapes by utilizing a variety of technologies including thermal impression, impact, electrographic, laser imaging, and ink jets. Typical print heads are manufactured as fixed or movable arrays of individual printing elements.

FIG. 1 is a schematic drawing of a prior art ink jet printing system 10 that incorporates a print head 12 containing an array of minute circular ink jet orifices 14 each of which ejects a droplet of ink 16 along an ink path 18 toward a print medium 20 to form an image 22. Print medium 20 is advanced in a direction 24 by the rotation of a media feed drum 26. Print head 12 is attached to an ink reservoir 28, which is mounted to a movable carriage 30 that slides on a guide rail 32. Carriage 30 is driven in a reciprocating motion 34 along the length of guide rail 32 by a drive band 36 wrapped around a pair of drive hubs 38. The printing of image 22 is accomplished by the controlled ejection of droplets of ink 16 from ink jet orifices 14 at times coordinated with the position of print head 12 relative to print medium 20.

FIG. 2 illustrates a typical prior art ink jet head assembly 40 such as that manufactured by Sharp, Limited, Nara, Japan. Ink jet head assembly 40 incorporates print head 12 having multiple ink jet orifices 14. Print head 12 is attached to ink reservoir 28 and mounted to carriage 30. One end of ink reservoir 28 is firmly attached to carriage 30 by a mounting screw 41 near a side margin 42 of a base surface 43. The other end of ink reservoir 28 is forced apart from carriage 30 by a jack screw 44 near the other side margin 42 of base surface 43. Turning jack screw 44 alters an azimuthal angle 45, which is defined as the angular displacement between the base surface 43 of ink reservoir 28 and a longitudinal axis 46 of guide rail 32. A change in azimuthal angle 45 changes the slope of an imaginary line 47 connecting the centers of ink jet orifices 14, thereby affecting their vertical spacing.

Droplets of ink 16 deposited on print medium 20 in a single pass of print head 12 undergoing reciprocating motion 34 define what is called a print band 48 having a vertical height 49. Problems associated with the use of jack screw mechanisms include mechanical instability, limited adjustment sensitivity, and interaction between the adjustment of azimuthal angle 45 and vertical height 49 of print band 48.

SUMMARY OF THE INVENTION

The mounting and alignment of a print head assembly to a movable carriage is the subject of this invention. Print heads developed by Tektronix, Inc., the assignee of this patent application, are capable of rapidly printing a wide gamut of colors with higher information density than that of prior art print heads. However, high information density print heads place strict demands on the mechanical alignment and adjustment stability of the moving components of the printing system in which they are installed.

An object of the present invention is, therefore, to provide an apparatus and a method for mounting to a movable carriage assembly a print head that is capable of accurate and sensitive print head azimuthal angle adjustment without disturbing other print head alignments or spacings.

Another object of the present invention is to provide such an apparatus and a method that ensures stability of the print head alignment.

A further object of the present invention is to provide an apparatus and a method that maintains print head alignment when the print head, ink reservoir, and carriage assembly form a massive structure that moves at high velocity and rapid acceleration.

Yet another object of the present invention is to provide a single inexpensive structure that integrates the functions of print head assembly and print head alignment.

The present invention uses three angularly inclined mounting surfaces to mate together the ink reservoir and movable carriage of a print head assembly along points in predetermined planes. A pair of pivoting clamps apply a force that urges the mounting surfaces of the ink reservoir and the carriage together while simultaneously providing a translation adjustment of the ink reservoir relative to the carriage in points in the planes defined by the mounting surfaces. Translation of the ink reservoir takes place across a first plane in a direction parallel to the guide rail, while translation of contact points takes place across second and third planes inclined at angles of equal magnitude but of opposite rotational sense. The proper placement of these three planes provides for an accurate and sensitive adjustment of print head azimuthal angle.

Additional objects and advantages of the present invention will be apparent from the following detailed description of preferred embodiments thereof that proceeds with reference to the accompanying drawings.

DETAILED DESCRIPTION OF PREFERRED EMBODIMENTS

Figure 1:
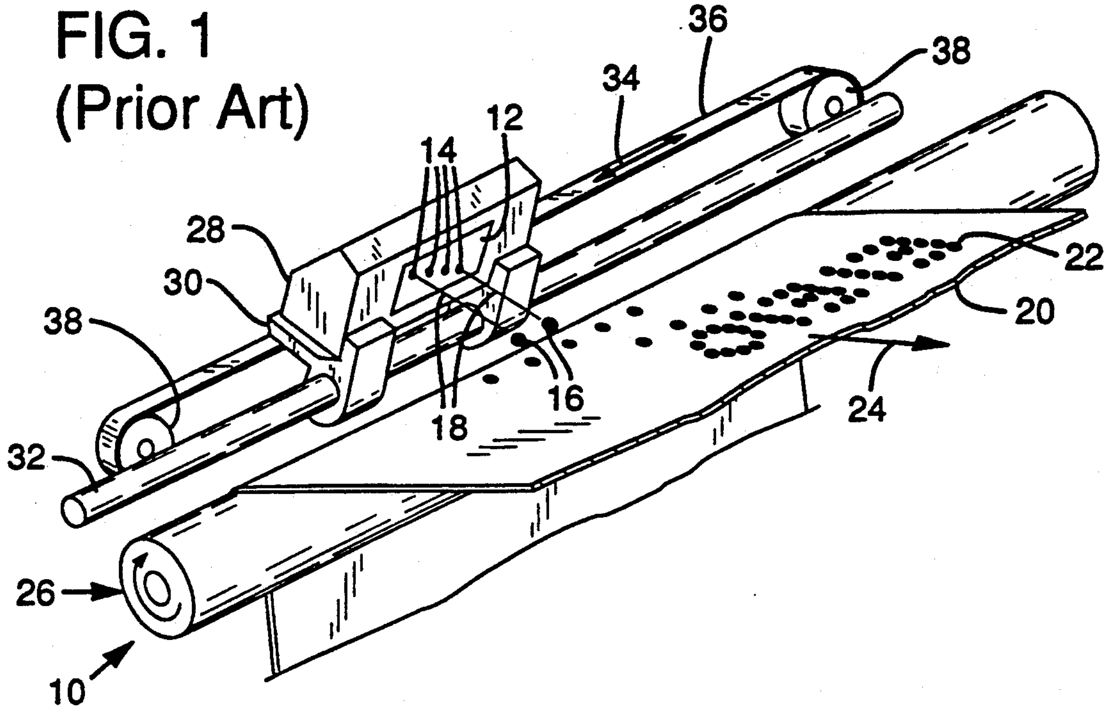
FIG. 1 (Prior Art)
FIG. 1 is a fragmentary isometric schematic drawing of a prior art ink jet printing system.
Figure 2:
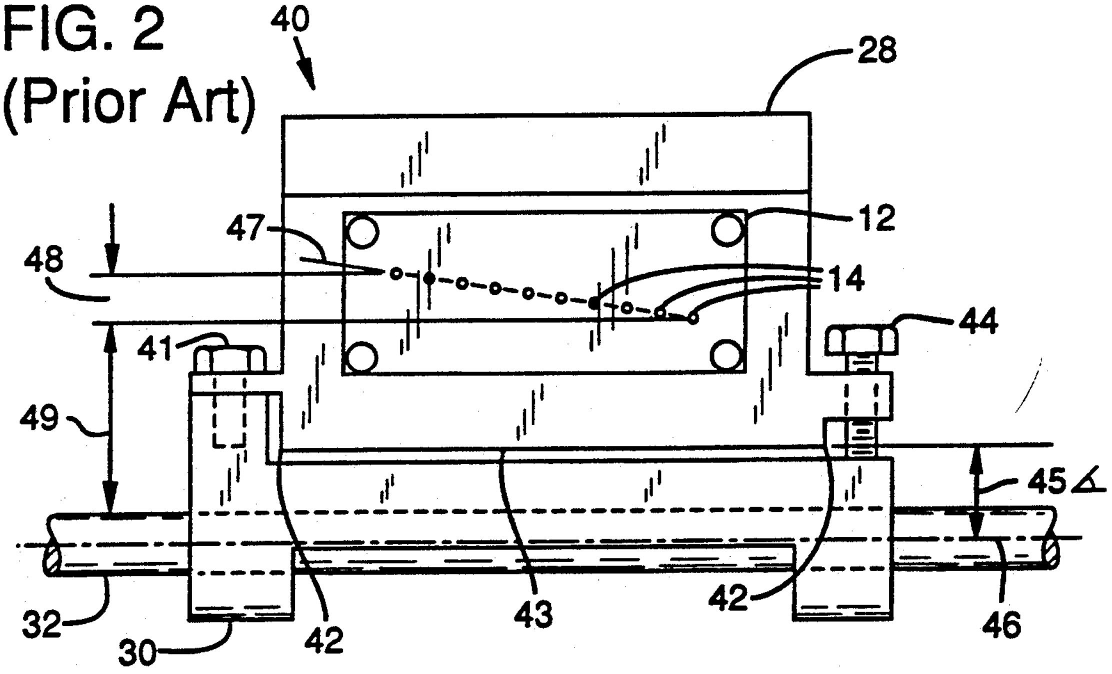
FIG. 2 (Prior Art)
FIG. 2 is a frontal side elevation view of a prior art ink jet head implemented with a jack screw for adjusting the print head azimuthal angle.
Figure 3:
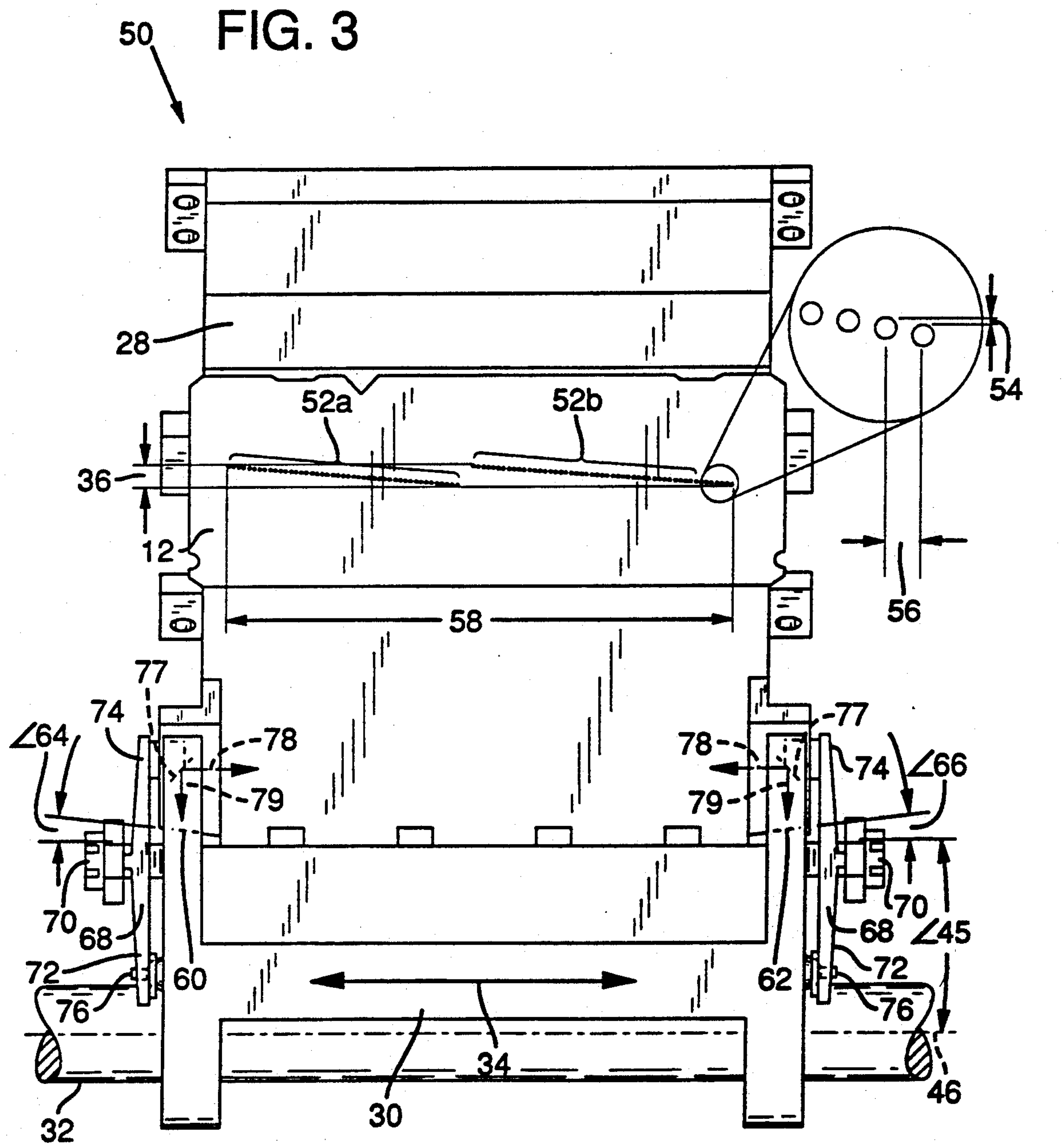
FIG. 3 is a frontal side elevation view, together with an enlarged fragmentary portion, of a print head assembly mounted to a movable carriage assembly and incorporating the mounting and alignment apparatus according to this invention.

FIG. 3 illustrates an ink jet head assembly 50 that includes a print head !2 having ninety-six ink jet orifices 14 arranged as a pair of spaced-apart, substantially non-overlapping parallel linear orifice arrays **52*a* and 52*b*. Each of the arrays 52*a* and 52*b* includes forty-eight orifices and has a negative slope as shown. Next adjacent orifices 14 in each of the orifice arrays 52*a* and 52*b* are separated by a vertical spacing 54 of 0.084 mm and by a horizontal spacing 56 of 0.84 mm. Ink jet orifice arrays 52*a* and 52*b* span a width 58 of 83.3 mm across print head 12**.

Print head 12 is capable of printing color images with droplets of ink 16 deposited on print medium 20 in a $12\times12$ dot per mm pattern when orifice arrays **52*a* and 52*b* are precisely aligned so that during a printing operation each orifice 14 of orifice array 52*a* deposits droplets of ink 16 exactly on top of droplets of ink 16 from each orifice 14 of corresponding position in orifice array 52*b*. Such alignment of droplets of ink 16** one on top of the other is called "registration."

Properly registered orifice arrays **52*a* and 52*b* result in a print band 36 of the proper width. The registration of droplets of ink 16 also depends on proper timing of the ejection of droplets of ink 16 from each ink jet orifice 14. However, the present invention addresses only the mechanical aspects of print head 12 alignment and mounting as they affect ink droplet registration. FIGS. 3, 4, 5, 6, and 7 show the design details of the construction and adjustment components of ink jet head assembly 50**.

Ink jet head assembly 50 weighs 1 kilogram, moves at a velocity of 675 mm per second, and reaches an acceleration of 19.5 meters per second per second. To achieve and maintain high quality printing performance with such an ink jet head assembly, print head 12 and ink reservoir 28 are pre-assembled as a unit and mated to a pair of inclined mounting surface ramps 60 and 62 on carriage 30. With particular reference to FIGS. 3, 4, 5, and 6, mounting surface ramps 60 and 62 are inclined at respective ramp angles 64 and 66 of equal value but of opposite rotational sense. Each of a pair of clamp plates 68 is secured to one side of carriage 30 by a cap screw 70. Each of clamp plates 68 has a pair of shoulder members 72 and 74 positioned at opposite ends thereof, different ones of the shoulder members contacting points on reservoir 28 and carriage 30. Shoulder members 72 of clamp plates 68 contact a pivot point 76 protruding from each side of carriage 30, and shoulder members 74 of clamp plates 68 contact an beveled contact tab 77 protruding from each side of reservoir 28. Tightening or loosening cap screws 70 causes clamp plates 68 to move on pivots 72 and thereby exert a translational force component 78 on beveled contact tabs 77. Clamp plates 68 simultaneously restrain ink reservoir 28 in position and by means of beveled contact tabs 77 exert a clamping force component 79 that urges reservoir 28 against mounting surface ramps 60 and 62.

To adjust the azimuthal angle 45 of ink reservoir 28, and thereby adjust the width of print band 36, it is necessary only to advance or back-out previously loosened cap screws 70 that hold clamp plates 68 so that ink reservoir 28 translates in either direction 34 parallel to longitudinal axis 46 of guide rail 32 relative to carriage 30. The relative translation causes ink reservoir 28 to move a vertical distance on mounting surface ramp 60 and to move an equal vertical distance but in the opposite direction on mounting surface ramp 62, thereby changing the azimuthal angle 45 of ink reservoir 28 relative to guide rail 32. Orifice arrays **52*a* and 52*b* are centered equidistant between the mounting surface ramps 60 and 62 so that the translation has substantially no effect on the vertical height of the center of print band 36 relative to guide rail 32. Once the required azimuthal angle 45 adjustment has been completed, cap screws 70** are tightened.

In the preferred embodiment, the desired combination of adjustment accuracy, adjustment stability, and clamping force is achieved with mounting surface ramp angles 64 and 66 inclined at 5.5° relative to central longitudinal axis 46 of guide rail 32. Mounting surface ramps 60 and 62 constitute segments of planes on carriage 30. A pair of mating surfaces **60*a* and 62*a* (FIG. 6) on ink reservoir 28 or on carriage 30 are preferably arcuate to form along mounting surface ramps 60 and 62 a line of contact that is perpendicular to the direction 34 of reciprocating motion. Movable carriage 30 is fabricated by die casting with polyetherimide filled with 15% glass fibers and 15% milled glass. Ink reservoir 28 is by die casting with magnesium. Cap screws 70 are of the #10-32 $\times\frac{3}{8}$" Allen head type and are tightened with a nominal torque of 6 kilogram-centimeters. Changes to the adjustment sensitivity of azimuthal angle 45 can be accomplished by altering equally the absolute values of mounting surface ramp angles 64 and 66 or by changing the thread pitch of cap screws 70**.

Figure 4:
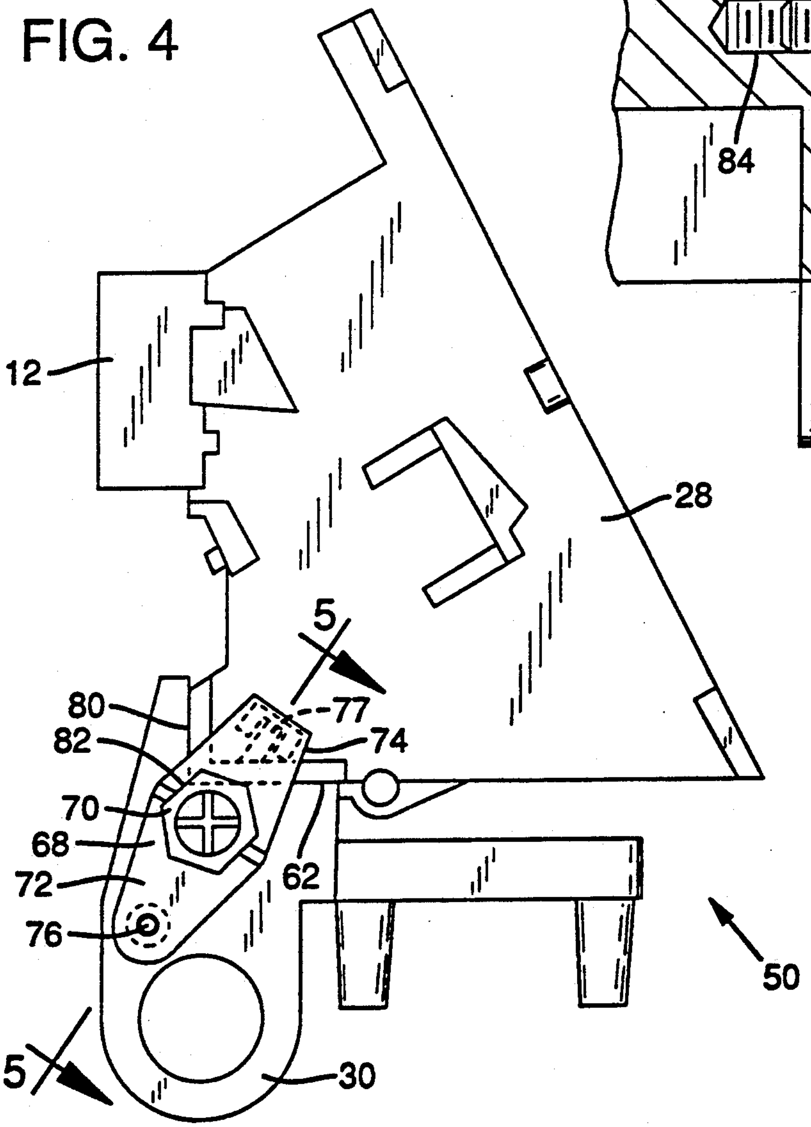
FIG. 4 is a side elevation view of an ink jet head assembly according to the invention.

FIG. 4, which is a right-hand side elevation view of ink jet head assembly 50 of FIG. 3, shows the relative positions of print head 12, ink reservoir 28, carriage 30, and clamp plate 68. FIG. 4 shows that mounting surface ramp 62 and a guide surface 80 of carriage 30 are disposed substantially at a right angle. The force exerted by clamp plate 68 on beveled contact tab 77 urges ink reservoir 28 into a corner 82 formed between mounting surface ramp 62 and guide surface 80. The left-hand side of ink jet head assembly 50 has mirror image features and applies the same but oppositely directed forces.

Figure 5:
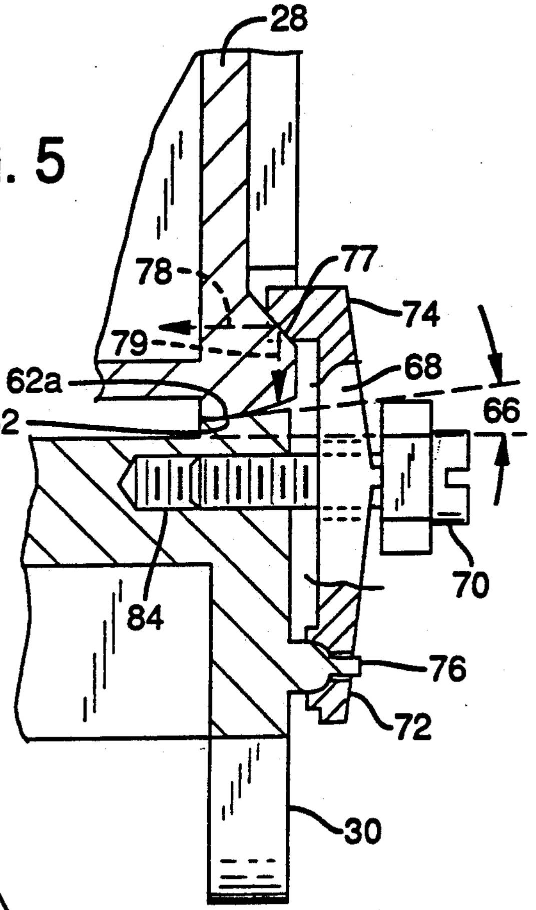
FIG. 5 is an enlarged sectional view taken along lines 5—5 of FIG. 4 to show the clamp plate, screw, pivot, and angular contact of the interfaces between the ink reservoir and the movable carriage.

FIG. 5 is useful in describing the operative relationships among ink reservoir 28, carriage 30, clamp plate 68, and cap screw 70. Cap screw 70 passes through clamp plate 68 and is threaded into a threaded hole 84 in carriage 30. Shoulder member 72 of clamp plate 68 swivels on pivot 76 and transmits a force via shoulder member 74 against beveled contact tab 77 on ink reservoir 28, the force being proportional to the tightening torque of screw 70. The force against beveled contact tab 77 is transmitted into ink reservoir 28 in a direction normal to the surface of beveled contact tab 77. The force has a translational component 78 and a clamping component 79. Cap screw 70, clamp plate 68, and beveled contact tab 77 work, therefore, in combination to adjust the translation of ink reservoir 28 relative to carriage 30 and to provide the force that urges ink reservoir 28 tightly against carriage 30 at mounting surface ramp 62 and mating surface 62a of ink reservoir 28.

Figure 6:
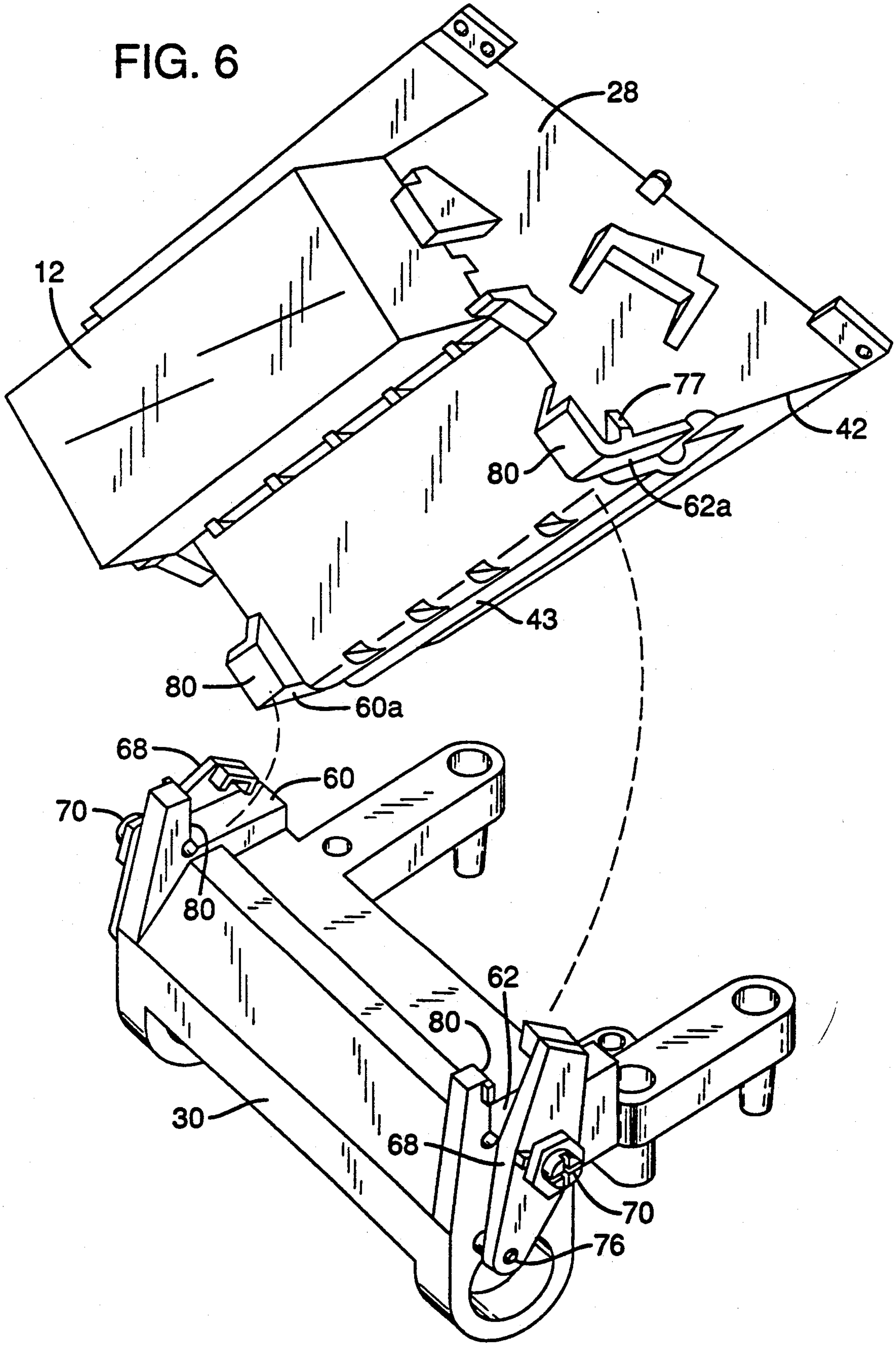
FIG. 6 is an isometric view of the ink jet head assembly exploded to show the guide surfaces, mounting surface ramps, one of the beveled contact tabs, and clamp plates thereof.

FIG. 6 is an exploded isometric view of ink jet head assembly 50 showing print head 12, ink reservoir 28, carriage 30, guide surfaces 80, mounting surface ramps 60 and 62, one of beveled contact tabs 77, base surface 43, one of side margins 42, clamp plates 68, cap screws 70, and one of pivots 76 as they would appear prior to mating of ink reservoir 28 and carriage 30.

Figure 7:
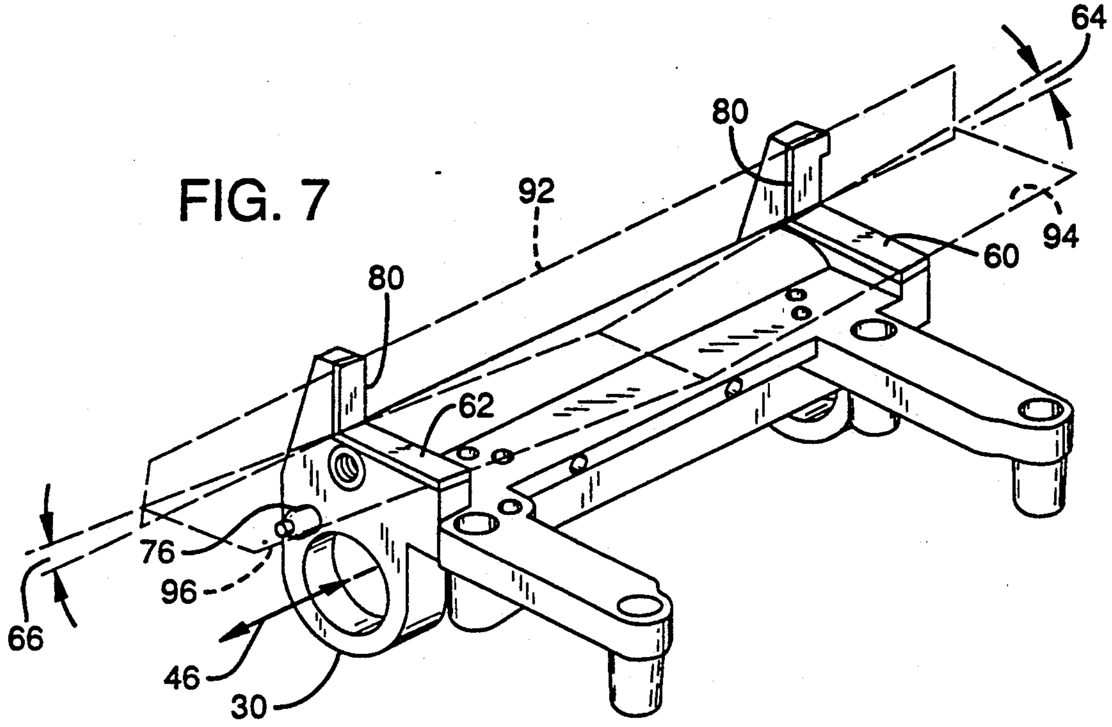
FIG. 7 is an isometric view of the movable carriage assembly illustrating the orientation of its mounting surface planes.

FIG. 7 is an isometric view of carriage 30 illustrating the angular relationships between mounting surface ramps 60 and 62, guide surfaces 80, and the direction of motion along longitudinal axis 46. Guide surfaces 80 are both disposed in a guide surface plane 92. Guide surface plane 92 is oriented parallel to longitudinal axis 46. Mounting surface ramp 60 lies in a first ramp plane 94, and mounting surface ramp 62 lies in a second ramp plane 96. In the preferred embodiment, first ramp plane 94 and second ramp plane 96 are both substantially perpendicular to guide surface plane 92 but it will be appreciated that other angles could also be effective. First ramp plane 94 and second ramp plane 96 form respective mounting surface angles 64 and 66 of equal value but of opposite rotational sense relative to longitudinal axis 46.

Figure 8:
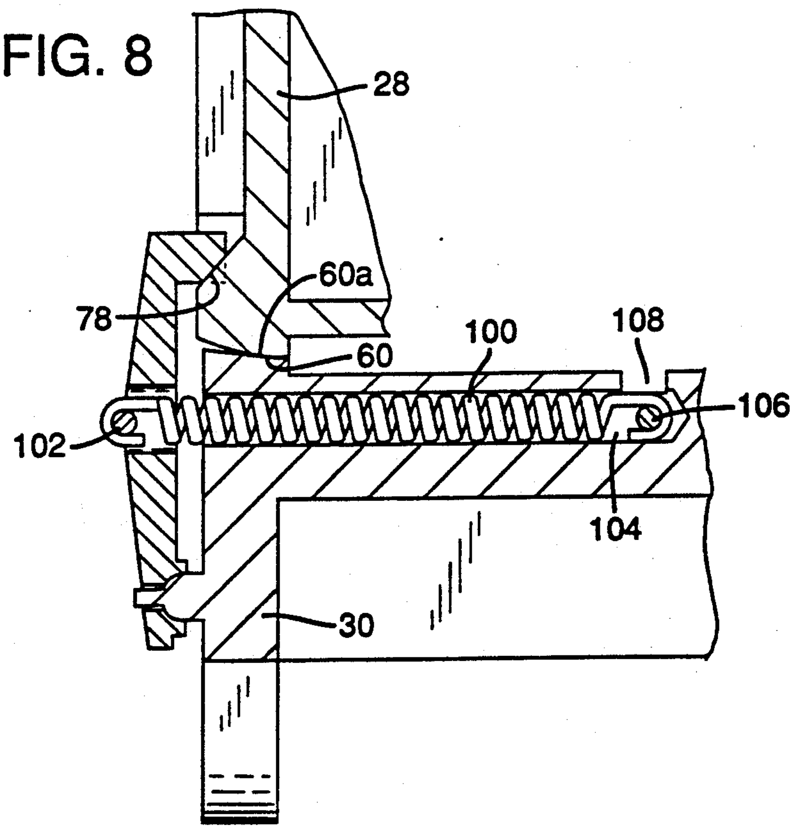
FIG. 8 is an enlarged fragmentary cross sectional view of an alternate embodiment of one clamp plate, ink reservoir, and moving carriage interface substituting a spring in place of the cap screw.

FIG. 8 is a fragmentary sectional view of an alternate embodiment of the invention. In this embodiment, either one of the two clamp plates 68 is modified to captivate a spring 100 by means of a first spring pin 102. Threaded hole 84 is modified to form an elongated spring passage 104. A second spring pin 106, accessible through access hole 108, captivates the other end of spring 100. In this embodiment, the force of spring 100 acting on contact tab 77 is of sufficient magnitude to overcome the translational forces present between mounting surface ramp 60 on carriage 30 and mating surface 60a on ink reservoir 28 when the assembled combination is being operated or transported. This embodiment provides improved ease of assembly and adjustment over the preferred embodiment but has reduced adjustment stability in instances where the print head assembly mass and acceleration loads exceed the spring force.

It will be obvious to those having skill in the art that many changes may be made to the details of the above-described preferred embodiment of the present invention without departing from the underlying principles thereof. For example, an ink jet print head is but one of various types of "array" or "matrix" technology printing heads. Accordingly, it will be appreciated that this invention is applicable to the mounting and alignment of print heads of other than the ink jet type in which case the ink reservoir could be replaced by a print head carrier. The scope of the present invention should be determined, therefore, only by the following claims.

I claim:

1. Apparatus for mounting and adjusting an azimuthal angle of a print head that is attached to a print head carrier, comprising:

a print head carrier having a pair of carrier mounting surfaces and a carrier guide surface, the carrier mounting surfaces being angularly inclined in opposite directions;

a carriage having a pair of carriage mounting surfaces and a carriage guide surface that contact a respective pair of carrier mounting surfaces and the carrier guide surface, the carriage mounting surfaces being angularly inclined in opposite directions and contacting a corresponding reservoir mounting surface of the same direction of inclination; and urging means operatively connected to the carrier and the carriage for applying a force with components that simultaneously urge the carrier and carriage guide surfaces against each other and translate the carrier and carriage guide surfaces relative to each other, whereby the inclined mounting surfaces of the carrier and carriage move relative to each other in the direction of co-respective inclinations to change the azimuthal angle of the print head.

2. The apparatus of claim 1 in which different ones of the carrier and carriage mounting surfaces in contact with each other have a flat surface and an arcuate surface.

3. The apparatus of claim 2 in which the carrier mounting surfaces are arcuate and the carriage mounting surfaces are flat.

4. The apparatus of claim 1 in which the carrier has a base with first and second opposed side margins and in which the pair of carrier mounting surfaces define angularly inclined intersecting planes that intersect the base near said first and second side margins, and the carrier guide surface defines a plane that is perpendicularly disposed to the angularly inclined intersecting planes.

5. The apparatus of claim 1 in which the carrier guide surface includes two spaced-apart upright members extending in a direction transversely of the carriage mounting surfaces.

6. The apparatus of claim 1 in which the print head carrier comprises an ink reservoir.

7. The apparatus of claim 1 in which the carrier has opposed carrier sides and opposed carriage sides and in which the urging means includes a pair of clamp plates, each of the clamp plates cooperating with a contact tab and a pivot on a common side of the carrier and the carriage to deliver a force to said plates.

8. The apparatus of claim 7 in which the contact tab and the pivot are positioned on the carrier and the carriage, respectively, and in which a screw threadedly engaging the carriage presses against and thereby applies the force to the clamp plate.

9. The apparatus of claim 8 in which a beveled surface of the contact tab extends outwardly of the side of the carrier and is oriented at an angle medially of the carrier guide surface and the carrier mounting surfaces.

10. The apparatus of claim 9 in which the screw applies the force to the clamp plate thereby developing the urging force sufficient to lock the carrier and the carriage together thereby preventing changes to the azimuthal angle when the print head moves in a reciprocating motion.

11. The apparatus of claim 7 in which the contact tab has a beveled surface and the clamp plate has a shoulder member that contacts the beveled surface, the beveled surface being oriented such said surface delivers the urging force and translating force components in response to the force applied to the clamp plate.

12. The apparatus of claim 7 in which the contact tab and the pivot are positioned on the carrier and the carriage, respectively, and in which a spring is fixedly displaced between the carriage and the clamp plate and thereby applies the force to the clamp plate.

13. The apparatus of claim 7 in which the pivot extends from a side of the carriage and presses against the clamp plate.

14. A method for mounting and adjusting an azimuthal angle of a print head that is attached to a print head carrier, comprising the steps of:

providing a print head carrier having a pair of print head carrier mounting surfaces and a print head carrier guide surface, the print head carrier mounting surfaces being angularly inclined in opposite directions;

providing a carriage having a pair of carriage mounting surfaces and a carriage guide surface that contact a respective pair of print head carrier mounting surfaces and the print head carrier guide surface, the carriage mounting surfaces being angularly inclined in opposite directions and contacting a corresponding print head carrier mounting surface of the same direction of inclination; and applying an urging force to the print head carrier and the carriage, the force having components that simultaneously urge the print head carrier and carriage guide surfaces against each other and translate the print head carrier and carriage guide surfaces relative to each other, thereby to translate the inclined mounting surfaces of the print head carrier and the carriage relative to each other in the direction of co-respective inclinations to change the azimuthal angle of the print head.

15. The method of claim 14 in which the print head carrier comprises an ink reservoir.

* * * * *